United States Patent
Yamazaki et al.

(10) Patent No.: US 6,705,186 B2
(45) Date of Patent: Mar. 16, 2004

(54) CONTROL UNIT OF MACHINE TOOL

(75) Inventors: Tsunehiko Yamazaki, Aichi-ken (JP); Haruhiko Koike, Gifu-ken (JP); Noboru Yamamoto, Aichi-ken (JP)

(73) Assignee: Yamazaki Mazak Kabushiki Kaisha, Aichi-Ken (JP)

( * ) Notice: Subject to any disclaimer, the term of this patent is extended or adjusted under 35 U.S.C. 154(b) by 121 days.

(21) Appl. No.: 10/174,744

(22) Filed: Jun. 19, 2002

(65) Prior Publication Data

US 2003/0041707 A1 Mar. 6, 2003

(30) Foreign Application Priority Data

Sep. 5, 2001 (JP) ........................................ 2001-269366

(51) Int. Cl.⁷ .............................................. B23B 13/04
(52) U.S. Cl. ......................................... 82/118; 82/129
(58) Field of Search ........................... 82/117, 118, 120, 82/121, 123, 129, 905

(56) References Cited

U.S. PATENT DOCUMENTS

| 4,624,466 A | 11/1986 | Steinberger | |
| 4,884,210 A | * 11/1989 | Blaimschein | ................ 700/159 |
| 5,174,179 A | * 12/1992 | Hiestand | ....................... 82/165 |
| 5,662,014 A | * 9/1997 | Link | ............................ 82/125 |

FOREIGN PATENT DOCUMENTS

| DE | 44 46 538 A | 6/1996 |
| EP | 0 180 731 A | 5/1986 |

* cited by examiner

*Primary Examiner*—Willmon Fridie, Jr.
(74) *Attorney, Agent, or Firm*—Duane Morris LLP

(57) ABSTRACT

A sensor 42d is provided for detecting release of a state of a workpiece fixed and held with workpiece holding members during rotation of a spindle 9. When the release of the state of the wokpiece fixed and held is detected, the sliding members are driven in a direction of an axial center (in a direction as shown by an arrow D) by a reciprocating drive means 42. Even if holding force, such as the oil pressure of the workpiece holding member, is lowered, the decrease of the holding force of the workpiece can be extremely avoided by moving the sliding members in the direction of the workpiece.

7 Claims, 13 Drawing Sheets

F I G. 2
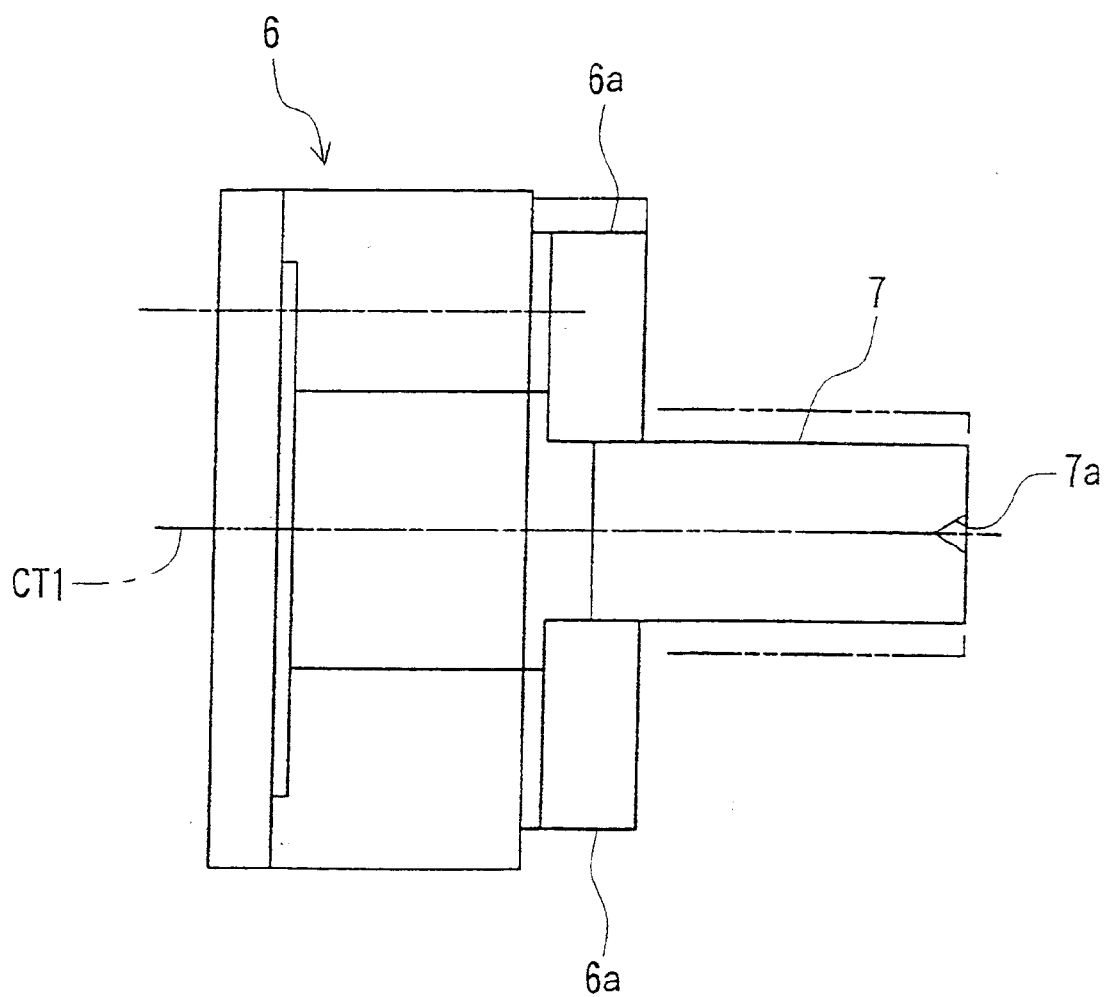

CONTROL UNIT OF MACHINE TOOL

BACKGROUND OF THE INVENTION

This invention relates to a control unit for a machine tool suitable for applying to a machine tool capable of holding a workpiece having a section which is a circular shape and a shape excluding a circular shape.

A recent proposal in order to perform milling machining and turning machining by certainly holding a workpiece which section is a circular shape or an another shape excluding the circular shape is that a plurality of holding members in the shape of a bar is provided at a chuck for holding a workpiece being free to project and drive in the direction of an axial center of the chuck, and a workpiece is held through a plurality of the holding members.

The chuck having such a structure is driven, interlocking the holding members provided at each jaw by oil pressure. When oil pressure is lowered during machining for some reasons, the holding force of a workpiece with the holding members rapidly lowers. Then, a measure desired is that the decrease of oil pressure is detected and a workpiece is properly held till emergency stop of a machine tool.

The object of the present invention is to provide a control unit for a machine tool capable of properly holding a workpiece having various sectional shapes in addition to a workpiece having a circular section even in the case of the decrease of holding force of holding member, such as oil pressure, taking the above-mentioned circumstances into consideration.

SUMMARY OF THE INVENTION

The invention of claim 1 is a control unit of a machine tool, said machine tool comprising:

a spindle being rotatable with an axial center as its center a chuck provided on said spindle;

a plurality of sliding members provided at said chuck, being free to move with respect to said axial center;

workpiece holding members provided at each said sliding member, being free to move and drive with respect to said axial center and being free to be fixed and held;

reciprocating drive means provided at said chuck, being free to drive and reciprocate within a predetermined stroke, thereby being free to move and drive said sliding member in a direction of said axial center; said machine tool having further characteristic:

projecting said workpiece holding members in said axial center direction and driving said reciprocating drive means so a to move said sliding members in said axial center direction when a workpiece is fixed and held with said chuck; said control unit comprising:

a sensor for detecting that the state of said workpiece being fixed and held with said workpiece holding members is released during rotation of said spindle; and a driving control means of said sliding member for driving and controlling said reciprocating drive means so as to drive said sliding member in said axial center direction when said sensor detects the state of said workpiece being fixed and held with said workpiece holding members is released.

According to the invention of claim 1, the driving control means of the sliding member drives and controls the reciprocating drive means so as to drive the sliding member in the direction of the axial center when the sensor detects that the state of the workpiece fixed and held with the workiece holding members is released during the rotation of the spindle. Then, the decrease of the holding force of the workpiece can be prevented to the utmost by moving the sliding members in the direction of the axial center, that is, in the direction of the workpiece even in the case of decrease of the holding force of the workpiece holding member, such as the oil pressure, thereby the workpiece having various sectional shapes can be properly held in addition to the workpiece having circular section.

The invention of claim 2 is the control unit of the machine tool as set forth in claim 1, wherein said reciprocating drive means has a driving cylinder, being free to reciprocate and drive a rod, and said rod is driven and reciprocated so as to move said sliding member in said axial center direction.

According to the invention of claim 2, the control at the time of failing is made easier, and the control unit having high credibility can be provided by using the driving cylinder as a reciprocating drive means.

The invention of claim 3 is the control unit of the machine tool as set forth in claim 1, wherein said reciprocating drive means has a member, being free to drive and move within a predetermined stroke, and said sensor detects movement of said member so as to detect release of a state of said workpiece being fixed and held with said workpiece holding members.

According to the invention of claim 3, the sensor detects the movement of the member of the reciprocating drive means, being free to drive and move within a predetermined stroke, thereby detecting the release of a state of the workpiece being fixed and held with the workpiece holding members. Then, the release of the state of being fixed and held can be easily detected.

The invention of claim 4 is the control unit of the machine tool as set forth in claim 1, wherein interlocking drive means of said workpiece holding members is provided between said respective sliding members, and said workpiece holding members of said respective sliding members can be synchronously moved by said interlocking drive means.

According to the invention of claim 4, the workpiece holding members synchronously driven by the interlocking drive means of the workpiece holding member has a danger of simultaneously losing the holding force of the workpiece even at the time of failing. But, proper measure can be taken by the present invention.

The invention of claim 5 is the control unit of the machine tool as set forth in claim 4, wherein said each sliding member is provided with a fluid driving means of said workpiece holding member, and said interlocking drive means has a fluid piping means for connecting said fluid driving means of said respective sliding members.

According to the invention of claim 5, the workpiece holding members communicated and connected by the fluid piping means has a danger of simultaneously losing the holding force of the workpiece at the time of failing when the fluid piping means makes some trouble. But, proper measure can be taken by the present invention.

The invention of claim 6 is the control unit of the machine tool as set forth in claim 3, wherein a position of said workpiece fixed and held with said reciprocating drive means is set at an intermediate position of said predetermined stroke of said reciprocating drive means.

According to the invention of claim 6, the position of the workpiece fixed and held is provided at an intermediate position of the predetermined stroke of the reciprocating drive means. Then, the sliding member can be easily driven in the direction of the axial center by further driving the reciprocating drive means in the direction of the stroke limit of the stroke at the time of failing.

The invention of claim 7 is the control unit of the machine tool as set forth in claim 1, wherein a spindle drive stop control means is provided for at least stopping rotating and driving said spindle when said sensor detects release of a state of said workpiece fixed and held with said workpiece holding members.

According to the invention of claim 7, the spindle drive stop control means can at least stop the rotation and driving of the spindle when the sensor detects the release of the state of the workpiece fixed and held by the workpiece holding members. Then, the spindle is immediately stopped in the state of maintaining the state of holding the workpiece, and it's safe.

BRIEF DESCRIPTION OF THE DRAWINGS

FIG. 2 is a view for showing a routine of machining on a workpiece using the chuck unit for the lathe of FIG. 1;

DESCRIPTION OF THE PREFERRED EMBODIMENTS

Figure 1:
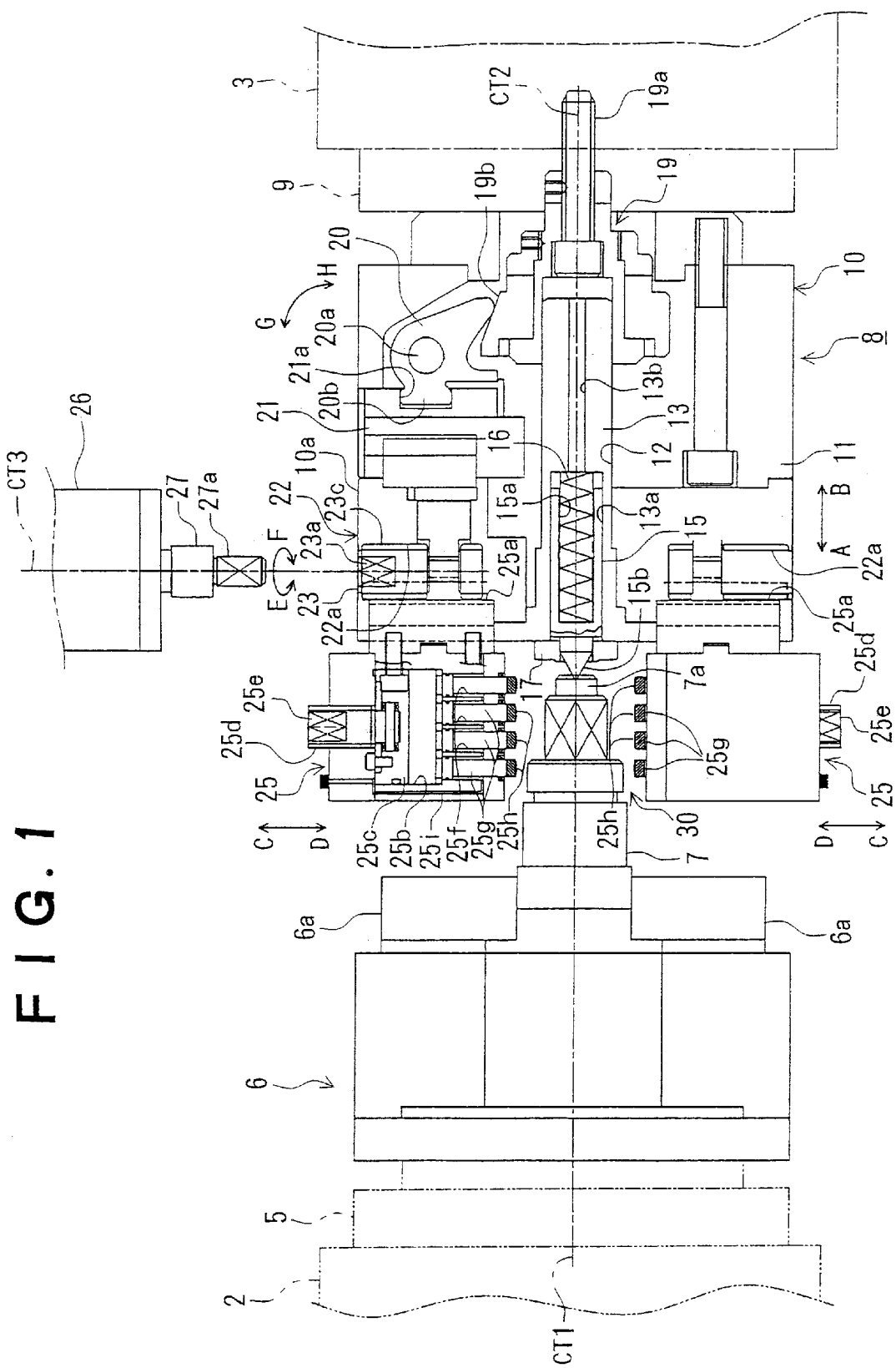
FIG. 1 is a view for showing an example of a machine tool having a chuck unit for a lathe applying the present invention.

Embodiments of the present invention will now be explained hereinafter, referring to the drawings.

Figure 10:
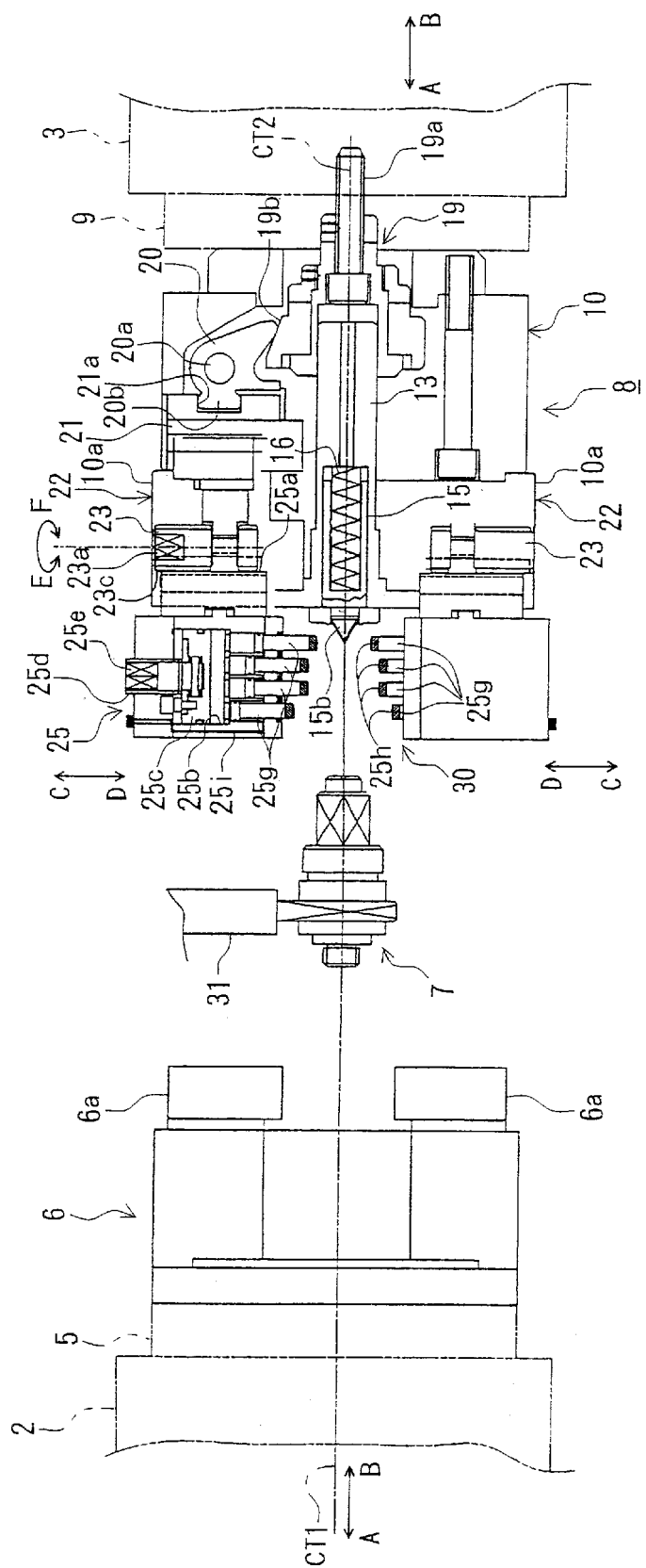
FIG. 10 is a view for showing a routine of machining on a workpiece using the chuck unit for the lathe of FIG. 1.
Figure 11:
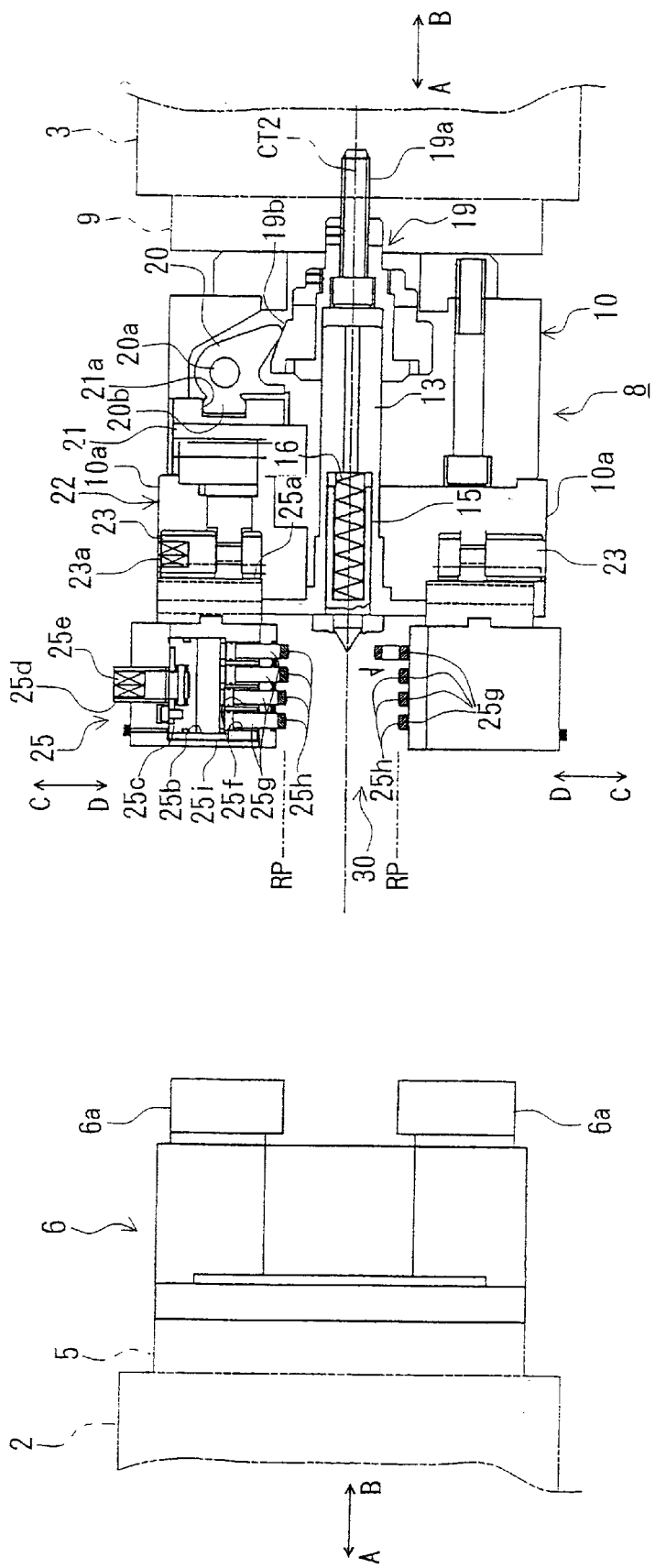
FIG. 11 is a view for showing a routine of machining on a workpiece using the chuck unit for the lathe of FIG. 1.
Figure 12:
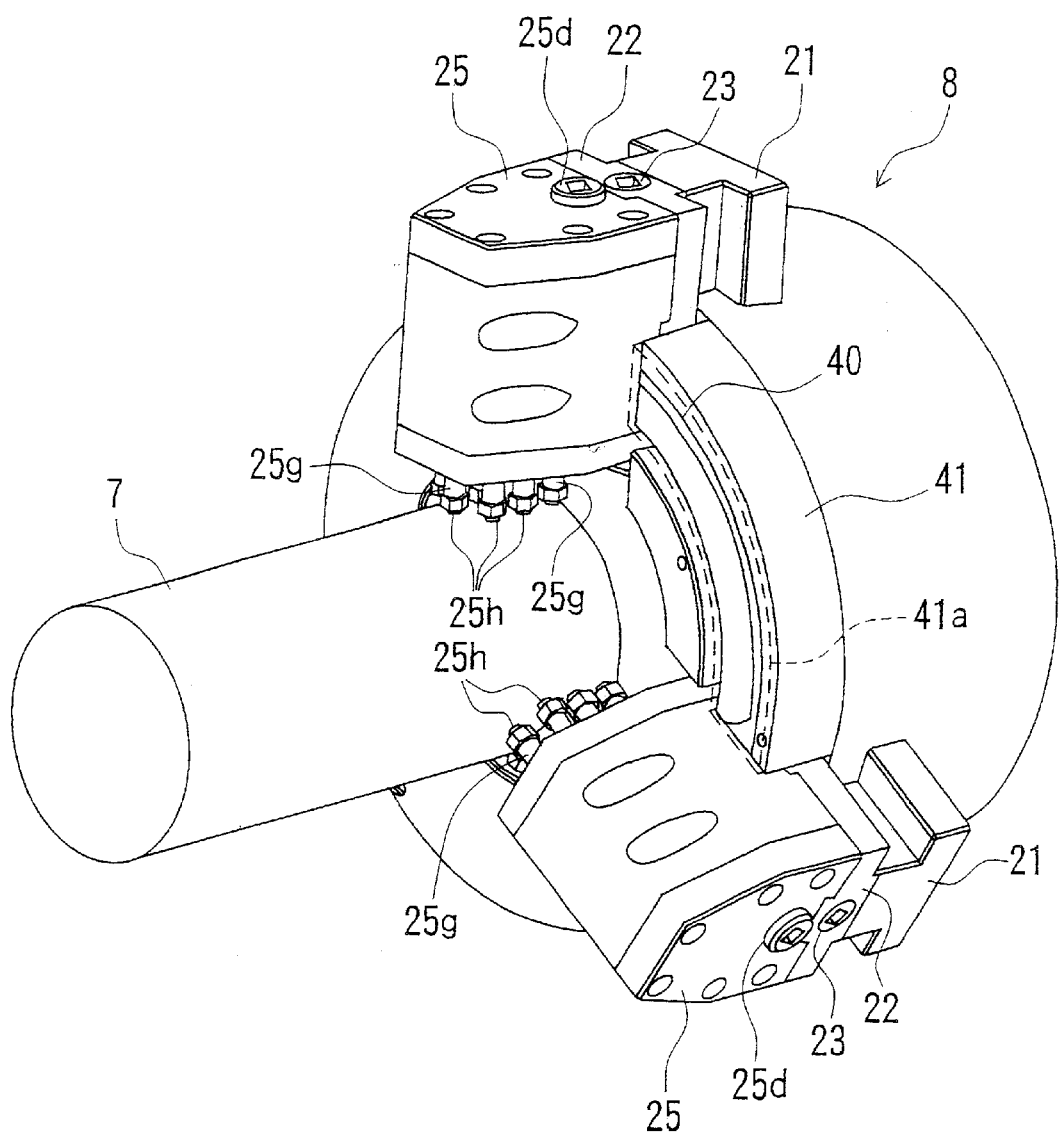
FIG. 12 is a perspective view for showing an example of the chuck unit for the lathe.
Figure 13:
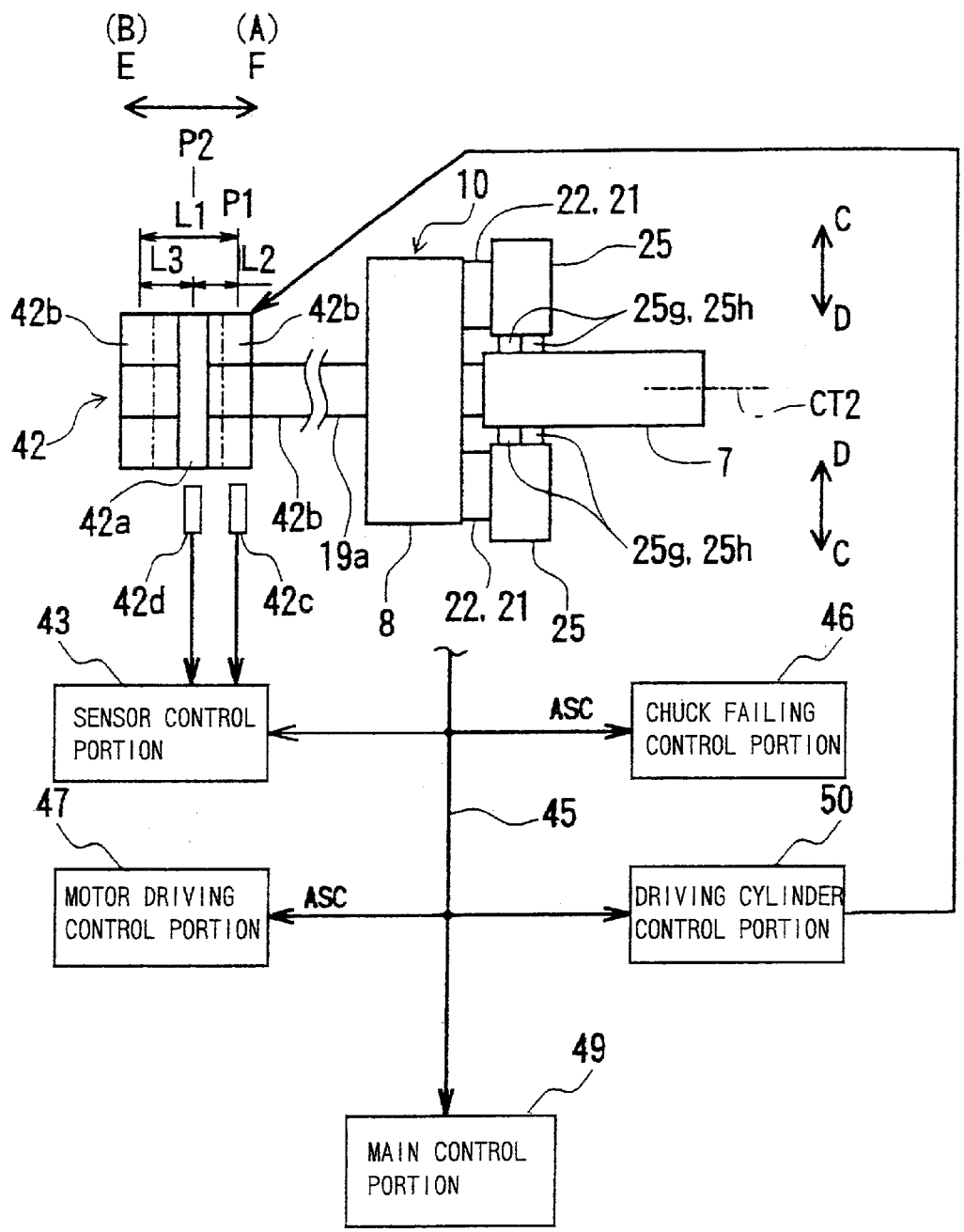
FIG. 13 is an example of a control block diagram of the machine tool.

FIG. 1 is a view for showing an example of a machine tool having a chuck unit for a lathe applying the present invention, FIGS. 2 through 11 are views for each showing a routine of machining on a workpiece using the chuck unit for the lathe of FIG. 1, FIG. 12 is a perspective view for showing an example of the chuck unit for the lathe, and FIG. 13 is an example of a control block diagram of the machine tool.

A lathe 1 which is a machine tool has spindle stocks 2, 3 provided facing each other, as shown in FIG. 1. The spindle stocks 2, 3 are provided being free to move and drive in a direction as shown by arrows A and B which is Z axis direction. At the spindle stock 2, a spindle 5 is provided, being free to rotate and drive with an axial center CT1 parallel to the Z axis as its center and being free to rotationally position at an optional angle, that is, being free to position at C axis angle with the axial center CT1 as its center. On a top end of the spindle 5, a chuck 6 is installed. Two or more jaws 6a are provided at the chuck 6, being free to move and drive in a direction as shown by arrows C and D which is a radial direction with the axial center CT1 as its center.

And, a spindle 9 is provided at the spindle stock 3, being free to rotate and drive with an axial center CT2 (corresponds with the axial center CT1) parallel to the Z axis as its center, and being free to rotationally position at an optional angle, that is, being free to position at the C axis angle with the axial center CT2 as its center. On a top end of the spindle 9, a chuck 10 comprising a chuck unit 8 is installed.

The chuck 10 has a main body 11 in the shape of a cylinder. At a center portion of the main body 11, a through hole 12 is formed so as to penetrate, corresponding its center with the axial center CT2. A sleeve 13 is inserted into the through hole 12. On the left hand of the sleeve 13 in the figure, a hole 13a is formed. An oil pressure supply hole 13b, provided corresponding its center with the axial center CT2, is connected with the hole 13a. A center 15 is inserted in and engaged with the hole 13a, being free to slide in the direction as shown by the arrows A and B, corresponding its axial center with the axial center CT2.

The center 15 has a hole 15a. A coil spring 16 is provided between the wall face of the left end of the hole 15a in the figure and the wall face of the right end of the hole 13a of the figure so as to contract, and the coil spring 16 always energizes the center 15 in the direction as shown by the arrow A. On the left end of the center 15 of the figure, a projecting portion 15b in the shape of a circular cone is formed, and a stop ring 17 is installed on the left end face of the sleeve 13 of the figure.

A base 19 is installed on a base end portion of the right hand of the sleeve 13 of the figure, and a bar 19a is provided at the base 19, corresponding its axial center with the axial center CT2. Three engagement faces 19b are formed on an outer peripheral portion of the base 19 at the pitch of 120° with the axial center CT2 as its center, corresponding to first jaws described hereinafter. A cam 20 supported by an axis 20a in a direction as shown by arrows G and H being free to oscillate is engaged with each engagement face 19b. Three cams 20 are formed at the pitch of 120° with the axial center CT2 as its center, and an engagement portion 20b is formed at each cam 20.

First jaws 21 are supported by the main body 11, being free to move in the direction as shown by the arrows C and D, which is a radial direction with the axial center CT2 as its center. Three first jaws 21 are provided, respectively facing the above-mentioned cams 20. On the right hand of each first jaw 21 of the figure, a ditch 21a is formed, and the engagement portion 20b of the above-mentioned cam 20 engages with the ditch 21a. A second jaw 22 is installed on each first jaw 21, and an adjusting screw 23 engages with the second jaw 22, being free to rotate.

The adjusting screw 23 has an adjusting hole 23a which section is a quadrangle, formed on an outer peripheral face 10a side of the chuck 10, and a feed screw 23c is formed at the outer peripheral portion of the adjusting screw 23.

Furthermore, a third jaw 25 is provided at the second jaw 22, being free to move in the direction as shown by the arrows C and D, which is a radial direction with the axial center CT2 as its center. On the right side of the third jaw 25 of the figure, a screw 25a is formed, engaging with the feed screw 23c of the adjusting screw 23. The third jaw 25 has a cylinder 25b, and a piston 25c is inserted into and engaged with the cylinder 25b, being free to slide in the direction as shown by the arrows C and D.

An operation rod 25d, fitting in the third jaw 25, is engaged with the piston 25c, being free to relatively rotate. A top end of the operation rod 25d of the figure projects on the outer peripheral face 10a side of the chuck 10. Furthermore, at its top end portion, an adjusting hole 25e which section is a quadrangle is formed. On the lower hand of the cylinder 25b of the figure, two or more sub-cylinders 25f are formed, and a piston rod 25g engages with each sub-cylinder 25f, being free to independently slide along the direction as shown by the arrows C and D which is the axial center direction of the sub-cylinder 25f.

Besides, a tool rest 26 is provided on the upper hand of the spindle stocks 2, 3 of the figure, being free to move and drive in the direction as shown by the arrows A and B which is the Z axis direction and in the direction as shown by the arrows C and D which is Y axis direction orthogonal to the Z axis. On the tool rest 26, a chuck jaw operation jig 27 can be attachably and detachably installed in addition to usual cutting tools, such as a bite, a drilling tool and a milling tool.

At the top end of the chuck jaw operation jig 27, an operation portion 27a which section is a quadrangle is formed, and the chuck jaw operation jig 27 can drive and rotate the operation portion 27a through a drive unit (not shown) at an optional angle in the direction as shown by arrows E and F with an axial center CT3 as its center by installing on the tool rest 26, similar to the rotational tool.

Besides, the respective cylinders 25b of the respective third jaws 25 are communicated and connected with each other with a plurality of connection tubes 40 (only one tube is shown in the figure) comprised of flexible synthetic resin, as shown in FIG. 12, and the connection tube 40 is provided, being covered by a cover 41 for protecting the tube 40 from chips. On this occasion, FIG. 12 shows such a state that an upper cover 41a portion is taken out from the cover 41. And, the respective cylinders 25b may be connected by a pipe member made of metal capable of being bent through a proper joint in addition to by the connection tube 40 made of synthetic resin.

And, a driving cylinder 42 for driving the bar 19a is connected on the right hand of the bar 19a in FIG. 1, as shown in FIG. 13. The driving cylinder 42 is provided with a piston 42b, being slidable in the direction as shown by the arrows E and F within the bounds of stroke L1. The piston 42a is provided with a piston rod 42b, projecting on the right hand of the figure, and the above-mentioned bar 19a is connected with the piston rod 42b.

Sensors 42c, 42d for detecting the stroke position of the driving cylinder 42 are located at proper positions of the driving cylinder 42. The respective sensors 42c, 42d are connected with a sensor control portion 43. A chuck failing control portion 46, a motor driving control portion 47, a driving cylinder control portion 50 and a main control portion 49 are connected with the sensor control portion 43 through a bus line 45.

The lathe 1 has the structure as mentioned before. In order to machine on a raw material workpiece 7 which section is a circular shape using the lathe 1, the raw material workpiece 7 is installed on the chuck 6 of the spindle stock 2 through the jaws 6a, and a center hole 7a is formed on an end face of the workpiece 7 by a center hole drill (not shown) installed on the tool rest 26, as shown in FIG. 2.

Figure 3:
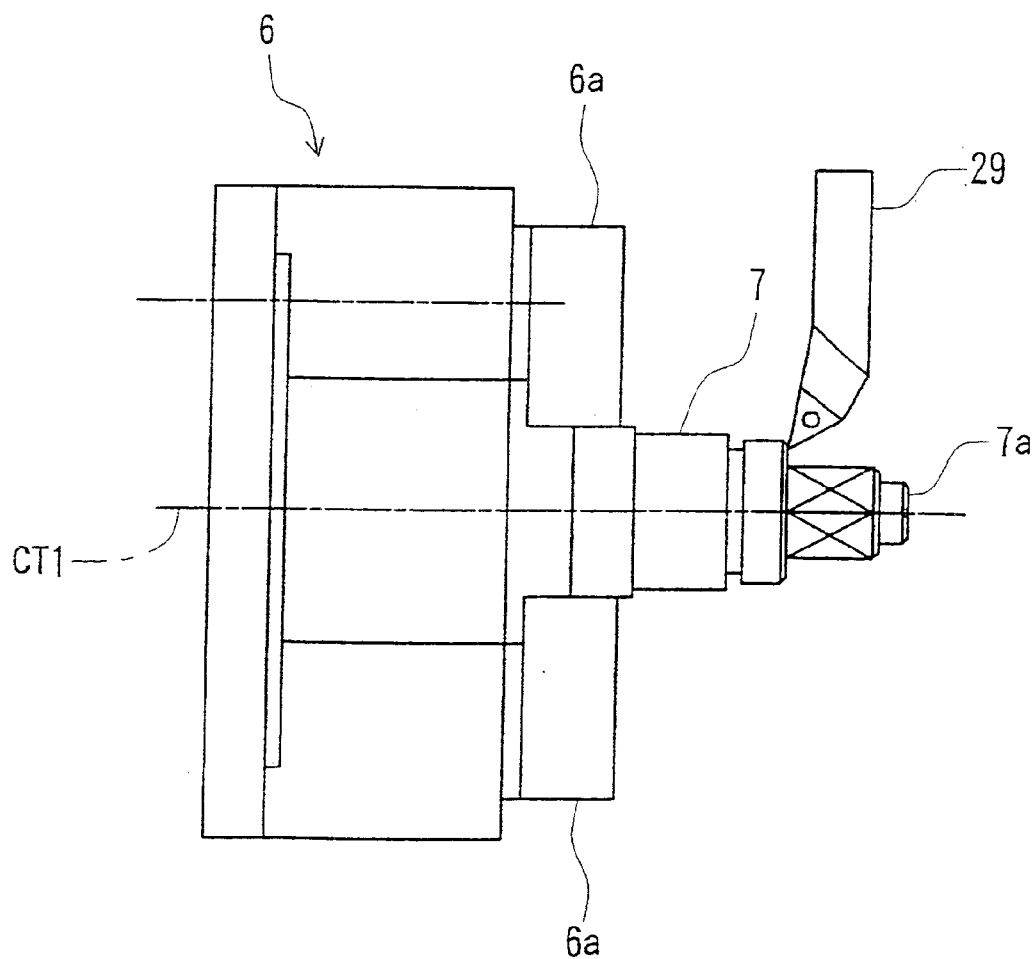
FIG. 3 is a view for showing a routine of machining on a workpiece using the chuck unit for the lathe of FIG. 1.

Subsequently, a cutting tool, such as a bite 29 or a rotating tool, such as a drilling tool and a milling tool is installed on the tool rest 26 so as to execute first routine of machining on the workpiece 7, as shown in FIG. 3. On this occasion, the raw material workpiece 7 can be easily held by the normal chuck 6 since its section is a circular shape. In the state that it is held, the first routine of machining can be smoothly executed on a right hand portion of the workpiece 7.

Figure 4:
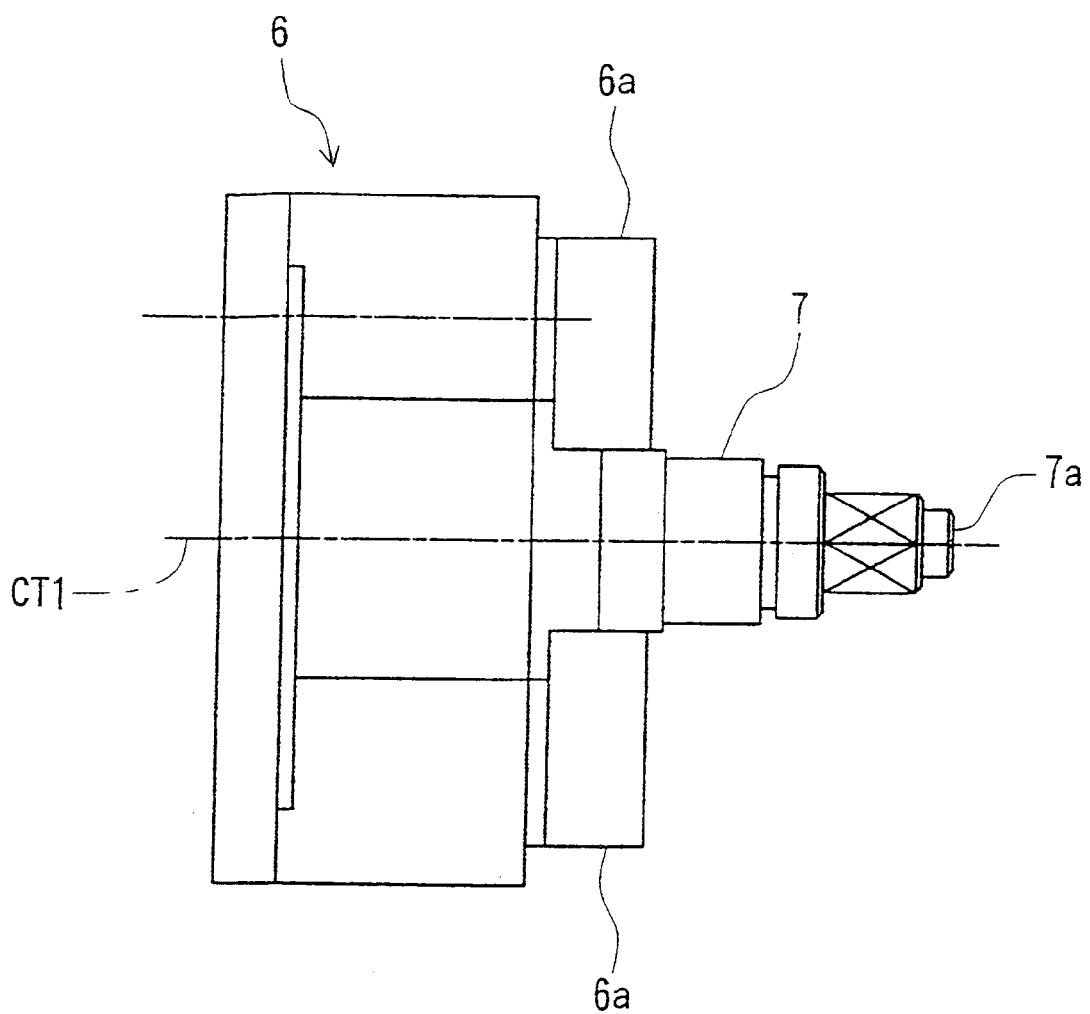
FIG. 4 is a view for showing a routine of machining on a workpiece using the chuck unit for the lathe of FIG. 1.

After the first routine of machining finishes on the right hand portion of the workpiece 7 of the figure in this way as shown in FIG. 4, the workpiece 7 after the first routine of machining is delivered to the spindle stock 3 so as to machine on pre-machined portion of the left hand of the workpiece 7 which has been held by the spindle stock 2. In order to machine on the left hand portion of the workpiece 7, it is necessary to hold the right hand portion of the workpiece 7, which section is machined in various shapes from the circular shape of the raw material after finishing the first routine of machining, with the chuck 10.

In order to do so, the spindle stock 2 holding the workpiece 7 on which the first routine of machining finishes is moved in the direction as shown by the arrow B and the top end of the workpiece 7 is inserted into a workpiece holding space 30 formed enclosing by two or more third jaws 25 being in open state of the chuck unit 8 of the spindle stock 3, as shown in FIG. 1.

In this state, the piston rod 25g of the third jaw 25 is moved in the direction as shown by the arrow C in the figure to the utmost by the operation rod 25d through the piston 25c. Therefore, a workpiece holding portion 25h of the top end of the piston rod 25g is in the state of being open in the radial direction with respect to the axial center CT2 to the utmost, that is, in the state of moving in the direction as shown by the arrow C to the utmost. Then, the top end of the workpiece 7 after finishing the first routine is smoothly inserted in the workpiece holding space 30 without the interference between the piston rod 25g and the workpiece 7.

When the top end of the workpiece on which the first routine of machining finishes is inserted into the workpiece holding space 30 formed among the third jaws 25 in the chuck unit 8, the projecting portion 15b of the center 15 is inserted into and engaged with the center hole 7a of the top end of the workpiece. Furthermore, the center 15 is slightly moved in the direction as shown by the arrow B against the elasticity of the coil spring 16 by driving the spindle stock 2 in the direction as shown by the arrow B, and the workpiece 7 is correctly held between the spindle stock 5 and the center 15, corresponding the axial center of the workpiece 7 and the axial center CT1 or CT2 of the spindle 5 or 9 with each other.

Subsequently, the piston 42a of the driving cylinder 42 as shown in FIG. 13 is moved and driven from the prior chuck open position P1 to a chuck closed position P2 through the driving cylinder control portion 50. Then, the bar 19a is moved and driven in the direction as shown the arrow E, that is, in the direction as shown by the arrow B of FIG. 1 through the piston 42a. And, the cam 20 engaging with the engagement face 19b of the base 19 oscillates in the direction as shown by the arrow G through the axis 20a, and with this movement, the three first jaws 21 are synchronously moved in the direction as shown by the arrow D, that is, in the direction of the axial center CT2 through the engagement portion 20b and the ditch 21a. Then, the second jaws 22 and the third jaws 25 installed on the first jaws 21 are also similarly moved in the direction as shown by the arrow D, and the piston rods 25g of the three third jaws 25 are synchronously moved and driven a predetermined distance in the direction of the axial center CT2 so as to position the third jaws 25 near the machined workpiece 7.

Subsequently, the chuck jaw operation jig 27 is installed on the tool rest 26, and in this state, the tool rest 26 is moved and driven in the direction as shown by the arrows A and B and in the direction as shown by the arrows C and D, and the operation portion 27a of the top end of the chuck jaw operation jig 27 is moved in the direction of the adjusting screw 23 of the second jaw 22 so as to insert into the adjusting hole 23a.

When the chuck jaw operation jig 27 is driven a predetermined rotational angle in the direction as shown by the arrow F in this state, the adjusting screw 23 is also rotated in the direction as shown by the arrow F so as to gradually move the third jaw 25 in the direction as shown by the arrow D, that is, in the axial center CT2 direction through the feed screw 23c and the screw 25a. In this way, the third jaw 25 is gradually moved in the direction of the workpiece 7 just before the workpiece holding portion 25h of the top end of the piston rod 25g of the third jaw 25 contacts with the outer peripheral portion of the workpiece 7.

At this time, driving and rotating of the adjusting screw 23 by the chuck jaw operation jig 27 is stopped, and the chuck jaw operation jig 27 is retreated in the direction as shown by the arrow C Besides, the chuck unit 8 is driven and rotated a predetermined rotational angle with the axial center CT2 as its center so as to face the adjusting screw 23 adjacent to the adjusting screw 23 which has been driven a little while ago and the chuck jaw operation jig 27 each other. By similar operations, the chuck jaw operation jig 27 is inserted into the adjusting hole 23a of the adjusting screw 23, and the workpiece holding portion 25h of the third jaw 25 connected with the adjusting screw 23 continues being moved just before contacting with the outer peripheral portion of the workpiece 7.

The workpiece holding portion 25h of the corresponding third jaw 25 continues being moved just before contacting with the outer peripheral portion of the workpiece 7 by the chuck jaw operation jig 27 concerning the remaining adjusting screws 23 in the similar way.

On this occasion, the movement operation of the third jaws by driving and rotating the adjusting screw 23 can be omitted when the workpiece holding portion 25h of the third jaw 25 is moved to the place where it nearly contacts with the outer peripheral portion of the workpiece 7 by the movement with the driving cylinder 42. Furthermore, the third jaw 25 may be directly installed on the first jaw 21 having no second jaw 22.

Figure 5:
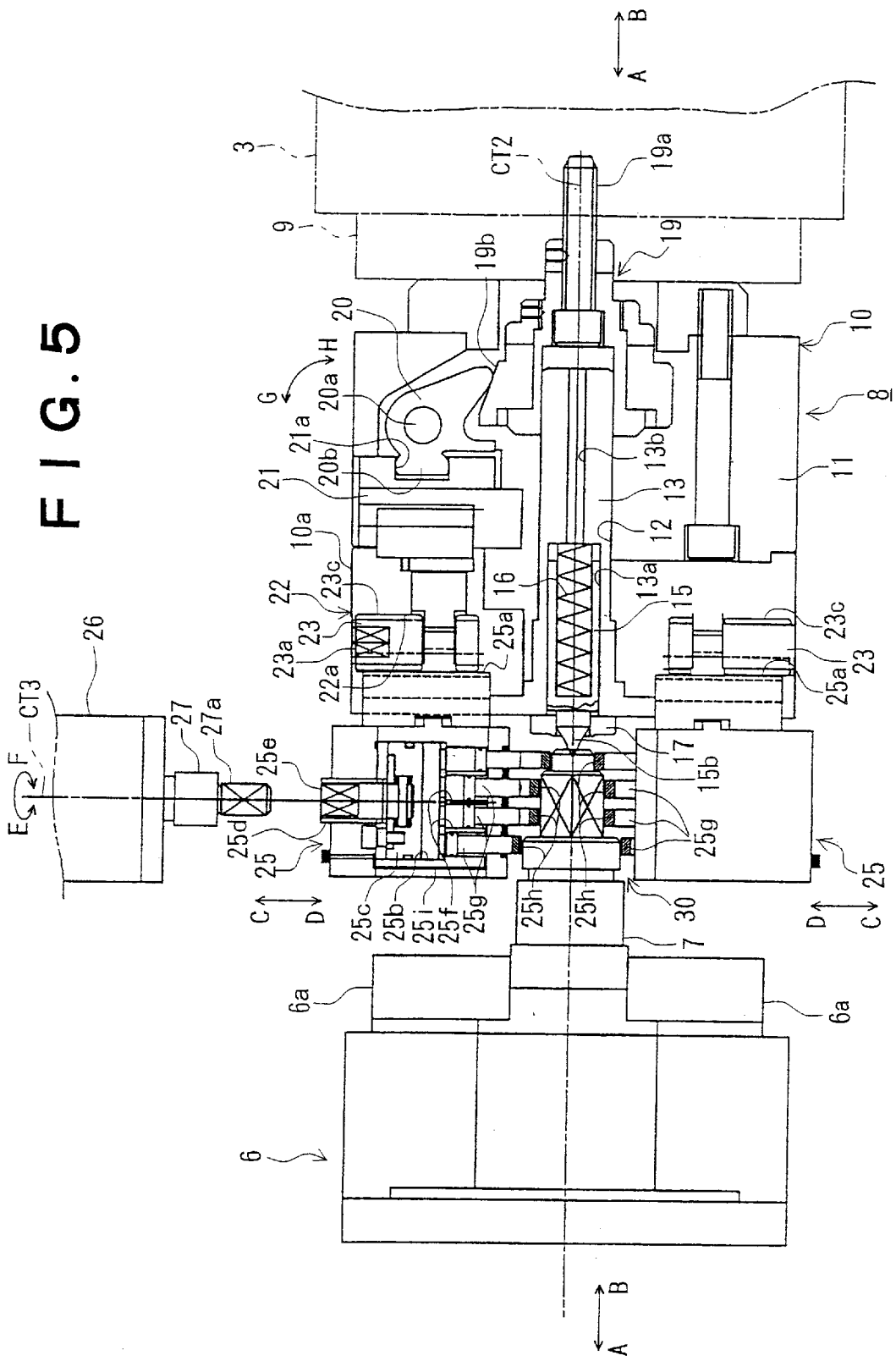
FIG. 5 is a view for showing a routine of machining on a workpiece using the chuck unit for the lathe of FIG. 1.

Subsequently, the operation portion 27a of the top end of the chuck jaw operation jig 27 is moved in the direction of the operation rod 25d of the third jaw 25 so as to inserted into and engaged with the adjusting hole 25e, as shown in FIG. 5. In this state, the chuck jaw operation jig 27 is driven a predetermined rotational angle in the direction as shown by the arrow F. Then, the operation rod 25d fitting in the third jaw 25 is also rotated in the direction as shown by the arrow F, and the operation rod 25d is gradually moved in the direction as shown by the arrow D, that is, in the direction of the axial center CT2 together with the piston 25c of the top end thereof. Then, pressure oil filled in the cylinder 25b is supplied in the cylinders 25b of the other two third jaws 25 connected by the cylinder 25b and the connection tube 40, and all the piston rods 25g in the sub-cylinders 25f of each third jaw 25 are synchronously moved in the direction of the axial center CT2.

On this occasion, the workpiece holding portion 25h of the top end of each piston rod 25g abuts on the machined outer peripheral portion of the workpiece 7 on which the first routine of machining finishes, and further movement in the direction of the axial center CT2, that is, in the direction as shown by the arrow D is prevented at this time. But, the piston rod 25g which has not yet abutted on the workpiece 7 of the two or more piston rods 25g is moved in the axial center CT2 direction, independently of the piston rods 25g, being already in the abutting state, and stops moving when the workpiece holding portion 25h of the top end thereof abut on the machined outer peripheral portion of the workpiece 7.

Contact pressure between the workpiece holding portion 25h of the piston rod 25g already being in the abutting state and the outer peripheral portion of the workpiece 7 is not increased so long as such a state that at least one piston rod 25g does not abut on the outer peripheral portion of the workpiece 7 is maintained although one or some piston rods 25g abut on the outer peripheral portion of the workpiece 7. The energy of pressure oil in the cylinder 25b is consumed for driving of the piston rods 25g which have not yet abutted on the workpiece 7, and inadvertently strong pressure does not act on the workpiece 7 from the piston rods 25g which have already contacted with the workpiece 7. Then, the workpiece 7 is held, corresponding its axial center and the axial center CT1 or CT2 of the spindle 5 or 9 with each other.

By doing so, as the result, all piston rods 25g of the three third jaws 25 abut on and contact with the outer peripheral portion of the workpiece 7 along the machining shape of the workpiece 7. On this occasion, the workpiece 7 is not bent even if the piston rods 25g abut on the machined contour portion of the workpiece 7 since the workpiece 7 is correctly held by the center 15 and the chuck 6, corresponding its axial center and the axial center CT1 or CT2 of the spindle 5 or 9 with each other, as already mentioned. And, various forms of driving of the piston rod 25g are thinkable in addition to the form using the cylinder 25b, and various forms, such as the form using air, and using magnetic force, can be adopted.

When all piston rods 25g of the three third jaws 25 lightly abut on the workpiece 7, the driving and the rotating of the operation rod 25d by the chuck jaw operation jig 27 is stopped, and the chuck jaw operation jig 27 is retreated in the direction as shown by the arrow C. Then, all piston rods 25g are slightly abutted on and contacted with the outer peripheral portion of the workpiece 7, enclosing the portion of the workpiece 7 on which the first routine of machining finishes by the workpiece holding portions 25h of many piston rods 25g from the radial direction with respect to its axial center, as shown in FIG. 5.

Figure 6:
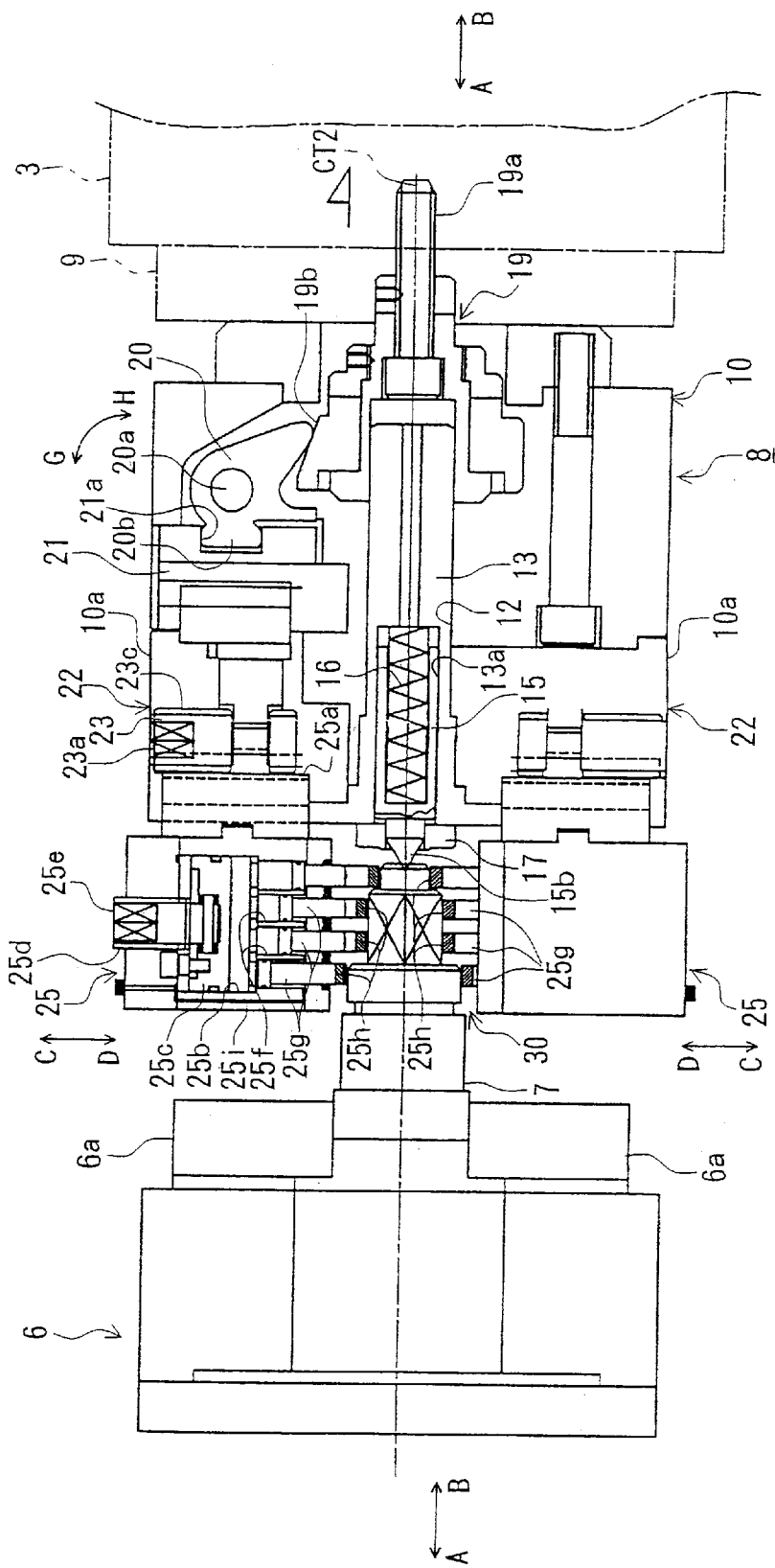
FIG. 6 is a view for showing a routine of machining on a workpiece using the chuck unit for the lathe of FIG. 1.

Subsequently, the chuck jaw operation jig 27 is retreated in the direction as shown by the arrow C, and the bar 19a of the base 19 is further pulled from the prior chuck closing position P2 in the direction as shown by the arrow E, that is, in the direction as shown by the arrow B of FIG. 1 through the driving cylinder 42 of FIG. 13, as shown in FIG. 6. Then, the cam 20 engaging with the engagement face 19b of the base 19 oscillates in the direction as shown by the arrow G through the axis 20a. Together with this, three first jaws 21 are synchronously moved in the direction as shown by the arrow D, that is, in the axial center CT2 direction through the engagement portion 20b and the ditch 21a. Then, the second jaw 22 and the third jaw 25 installed on the first jaw 21 are also moved in the direction as shown by the arrow D similarly, and the piston rods 25g of the three third jaws 25 are synchronously pressed in the axial center CT2 direction.

The capacity of the cylinder 25b of the third jaw 25 at which the piston rods 25g are provided is fixed since the piston 25c is fixed by the operation rod 25d fitting in the third jaw 25, and the pressure oil in the cylinder 25b has incompressibility. Taking the above-mentioned facts into consideration, each piston rod 25g, which has contacted with the workpiece 7 with light contact pressure, is contacted with and engaged with the outer peripheral portion of the workpiece 7 with the pressure corresponding to the movement stroke of the third jaw 25 in the direction as shown by the arrow D by moving the third jaw 25 in the axial center CT2 direction. Then, the workpiece 7 is strongly held by the three third jaws 25 through many piston rods 25g provided at these third jaws 25. On this occasion, the piston rods 25g of the respective third jaws 25 communicate with each other through each cylinder 25b and the connection tube 40. Then, the contact pressure with respect to the workpiece 7 is constantly maintained, independently of the movement stroke when the piston rod firstly contacts with the outside peripheral portion of the workpiece 7.

Besides, before the movement of the first jaw 21 in the direction as shown by the arrow D, the contact state between each piston rod 25g and the outer peripheral portion of the workpiece 7 is such a state that the piston rod 25g is slightly contacted with and engaged with the outer peripheral face of the workpiece 7. Then, the difference of the contact pressure between the piston rods 25g of each third jaw 25 can be almost neglected in such a state. From this fact, the contact pressure between the piston rods 25g with respect to the workpiece 7 is almost equal when the workpiece 7 is held by the third jaws 25 together with retreating of the first jaws 21, and the workpiece 7 is held by the three third jaws 25 with equal holding pressure.

The quantity of pulling the driving cylinder 42 from the chuck closing position P2 in the direction as shown by the arrow E of FIG. 13 is only extremely small, such as 1 mm level since each piston rod 25g has already be in the state of abutting on the workpiece 7 at the chuck closing position P2. Therefore, the sensor control portion 43 can detect the rise of the oil pressure supplying the driving cylinder 42 by a sensor (not shown), and can properly detect the finish of holding the workpiece 7 with the third jaws 25 of the chuck 10 by the sensor 42d. The respective sensors 42c, 42d of FIG. 13 are for detecting dogs (not shown) installed on a proper positions of the piston rod 42a. But, any structure of the chuck jaw position detecting means, such as the sensors 42c, 42d may be used as long as it can detect the positioning state of the radial direction of the third jaw 25, that is, in the direction as shown by the arrows C and D of FIG. 1.

And, the stroke L2 of the driving cylinder 42 as an actuator for driving the third jaw 25 when the third jaw 25 is moved and driven from the chuck opening position P1 to the chuck closing position P2 is made smaller in comparison with the whole moving stroke L1 of the driving cylinder 42, and the driving cylinder 42 has a margin stroke L3 further movable for the left hand of FIG. 13 from the chuck closing position P2. Then, the third jaw 25 can be also further moved in the direction as shown by the arrow D rather than a preparation position P2.

Figure 7:
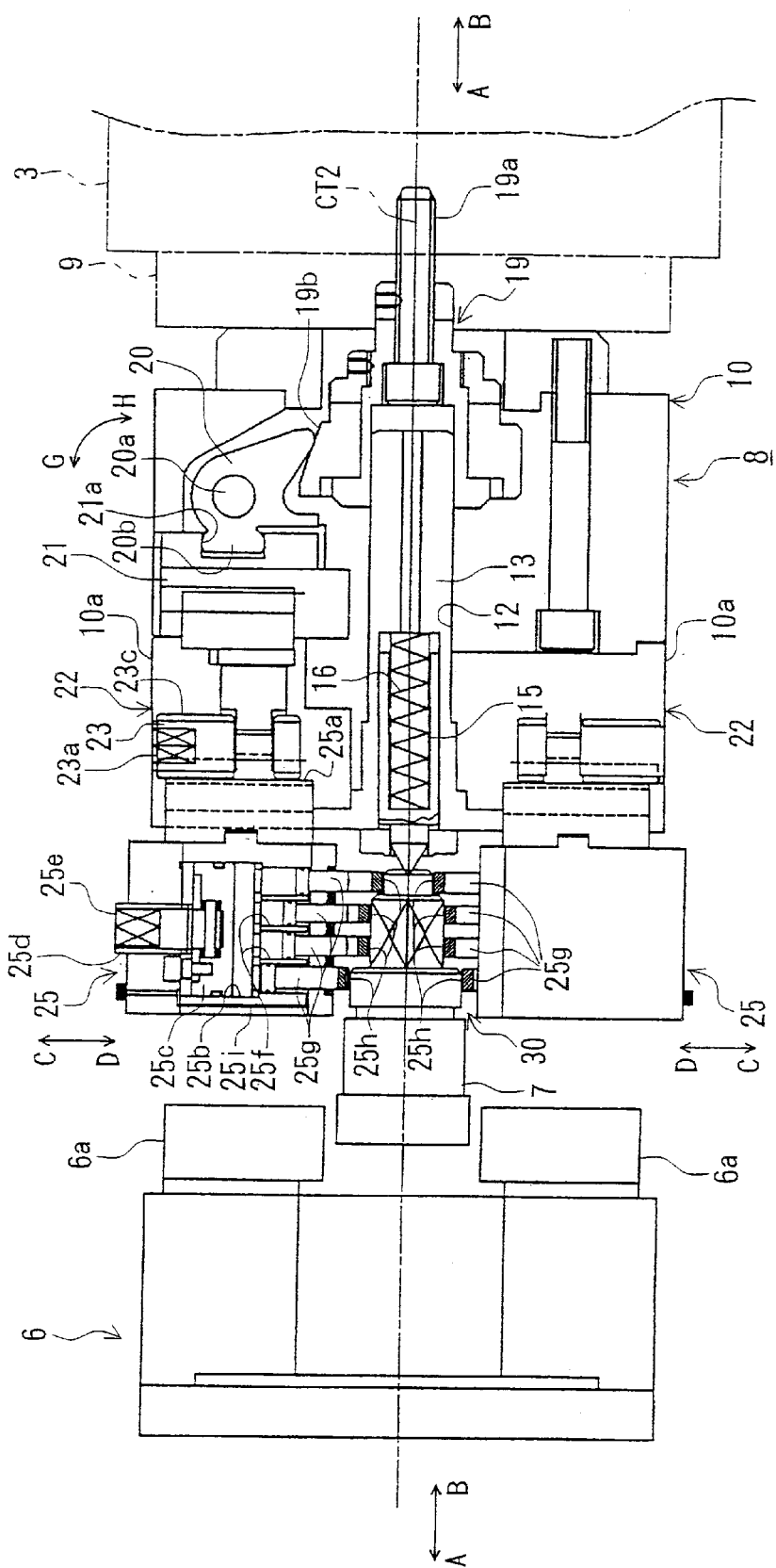
FIG. 7 is a view for showing a routine of machining on a workpiece using the chuck unit for the lathe of FIG. 1.

When the workpiece 7 is held by the third jaws 25 of the chuck 10 in this way and the jaws 6a of the chuck 6 of the spindle stock 2 are opened in the direction as shown by the arrow C, the workpiece 7 on which the first routine of machining finishes is certainly held by the chuck unit 8, corresponding its axial center and the axial center CT2 of the chuck unit 8 with each other by the third jaws 25, as shown in FIG. 7.

Figure 8:
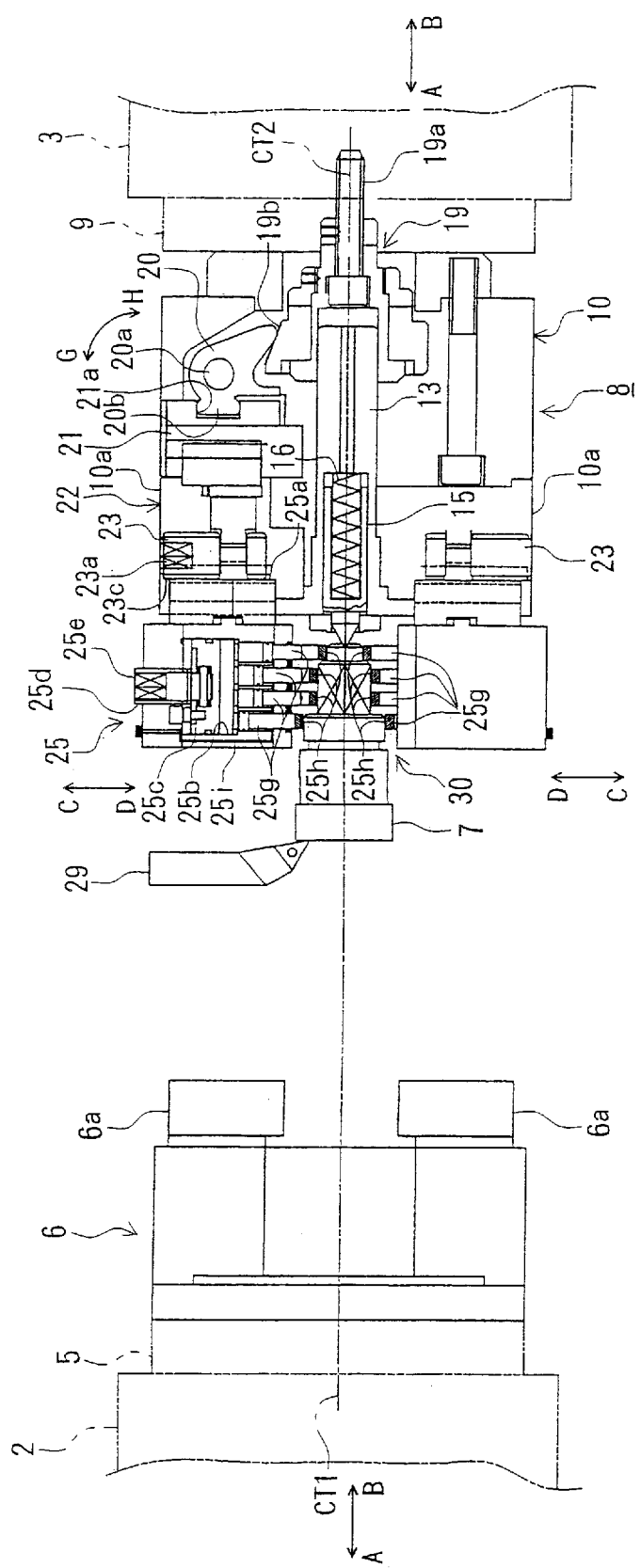
FIG. 8 is a view for showing a routine of machining on a workpiece using the chuck unit for the lathe of FIG. 1.

In this state, the spindle stocks 2, 3 are relatively moved in the direction of going away from each other, as shown in FIG. 8. The bite 29 or a tool, such as a milling tool, a fraise tool, and a drilling tool is installed on the tool rest 26 in place of the chuck jaw operation jig 27. And, a second routine of machining is executed on the pre-machined portion of the left half in the figure of the workpiece 7 in such a manner that the spindle 9 is driven and rotated at a predetermined rotational number or is positioned and held at a predetermined rotational angle position according to the machining program of the workpiece 7. The second routine of machining is smoothly executed since the workpiece 7 is certainly held by the third jaws 25 through the portion on which the first routine of machining finishes, as already mentioned.

Figure 9:
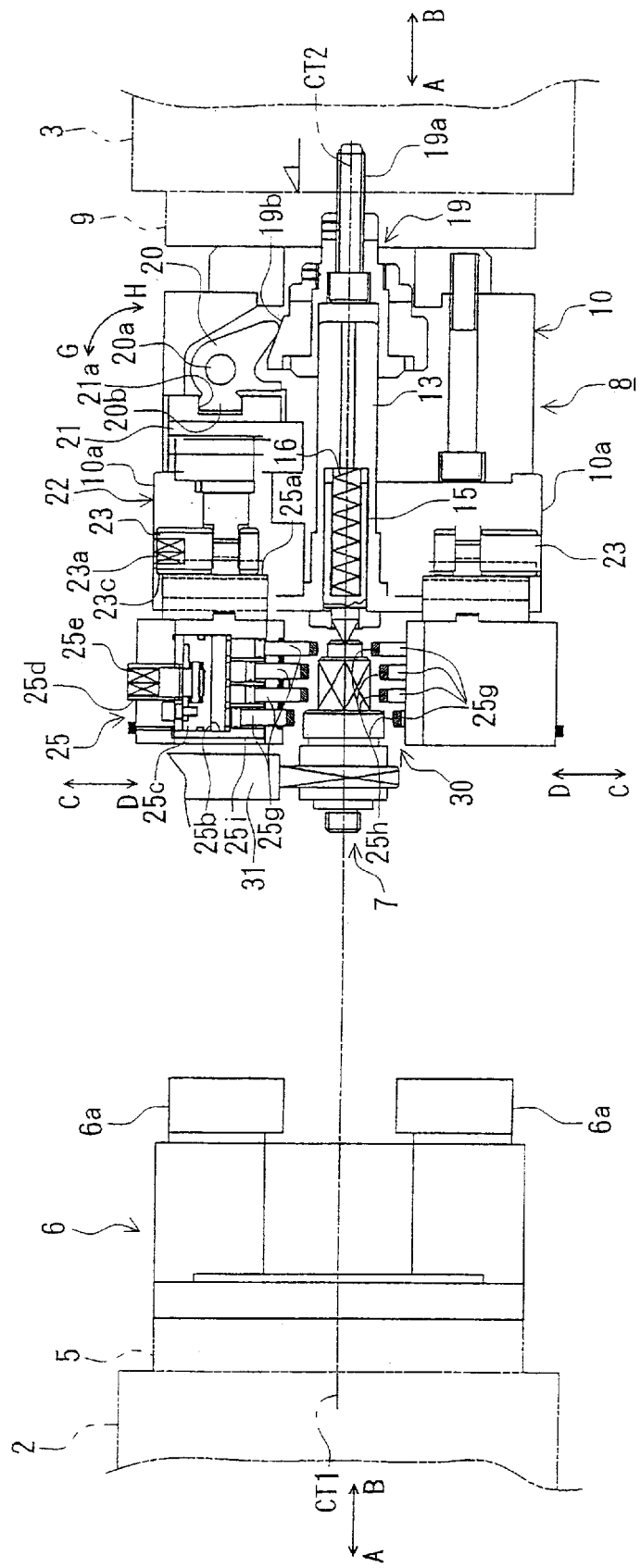
FIG. 9 is a view for showing a routine of machining on a workpiece using the chuck unit for the lathe of FIG. 1.

After finishing the second routine of machining on the workpiece 7, the workpiece 7 after the second routine of machining, which is held by the chuck unit 8, is held by a handling robot 31, as shown in FIG. 9. In this state, the driving cylinder 42 is moved in the direction as shown by the arrow F of FIG. 13 so as to move from the prior chuck closing position P2 to the chuck opening position P1. Then, the bar 19a of the base 19 is pressed in the direction as shown by the arrow A of FIG. 9, and the cam 20 engaging with the engagement face 19b of the base 19 oscillates in the direction as shown by the arrow H through the axis 20a.

At the same time, the three first jaws 21 are synchronously moved in the direction as shown by the arrow C, that is, in the radial direction with the axial center CT2 as its center, in the direction being away from the axial center CT2 through the engagement portion 20b and the ditch 21a. Then, the second jaw 22 and the third jaw 25 installed on the first jaw 21 also move in the direction as shown by the arrow C in a similar way, the piston rods 25g of the three third jaws 25 also move in the direction of the arrow C and the workpiece holding portions 25h which have been contacted with and engaged with the workpiece 7 with a predetermined holding pressure also move in the direction as shown by the arrow C.

By doing so, the contact and engagement relation between the piston rod 25g and the outer peripheral portion of the workpiece 7 is also released, and the workpiece 7 is held by the handling robot 31. Then, the machined workpiece 7 is taken out from the workpiece holding space 30 of the chuck unit 8 by relatively moving the handling robot 31 in the direction as shown by the arrow A with respect to the spindle stock 3, as shown in FIG. 10. The machined workpiece 7 taken out is carried to a proper parts catcher outside the machine.

In order to move all the piston rods 25g for the retreated position in the direction as shown by the arrow C, the operation rod 25d of the third jaw 25 is driven and rotated in the direction as shown by the arrow E, and the piston 25c is moved in the direction as shown by the arrow C, that is, in the direction being away from the axial center CT2. Then, the respective piston rods 25g in the sub-cylinders 25f of all the third jaws 25 connected by the connection tube 40 are synchronously moved in the direction as shown by the arrow C, that is, in the direction being away from the axial center CT2 so as to be stored in the retreated position RP, as shown in FIG. 11. By doing so, the workpiece holding portions 25h also retreat in the direction as shown by the arrow C, and the workpiece holding space 30 is widely opened at the periphery of the axial center CT2.

On this occasion, the piston rod 25g can be compulsorily moved in the direction as shown by the arrow C by supplying each sub-cylinder 25f with compressed air from a proper working fluid supply means side, such as the tool rest 26 through an air supply path 25*i* formed so as to open near the adjusting hole 25*e* of the operation rod 25*d* of the outer peripheral portion of each jaw 25 when the piston rod 25*g* is not sufficiently moved to the retreated position in the direction as shown by the arrow C with only movement of the piston 25*c* in the direction as shown by the arrow C.

Furthermore, in an another method, each piston rod 25*g* may be stored in the sub-cylinder 25*f* by rotating the spindle 9 at an intermediate speed so as to compulsorily move each piston rod 25*g* in the direction as shown by the arrow C by its centrifugal force.

And, the second jaw 22 and the adjusting screw 23 are not necessary when the stroke of the third jaw 25 in the axial center CT2 direction can be sufficiently secured by the driving cylinder 42, as mentioned above, and such a structure that the third jaw 25 can be directly synchronously moved in the direction as shown by the arrows C and D by the first jaw 21 is also possible.

Furthermore, the structure of the first, the second and the third jaws may be that the first and the second jaws are united as a sliding member and the first jaw is provided with the adjusting screw 23 so as to directly move and drive the third jaw in the direction as shown by the arrows C and D by the adjusting screw 23.

And, the number of the workpiece holding members, such as the third jaws, and of the sliding members for opening, closing and driving the workpiece holding member, such as the first jaws, to be installed on the main body 11 of the chuck unit 8 is not always three, but may be two, or four or more.

Besides, the number of the workpiece holding rods, installed on each workpiece holding member, such as the piston rods 25*g*, are not always four in a line concerning each jaw, as the embodiment. But, a plurality of the workpiece holding rods may be provided concerning each jaw. Besides, the workpiece holding rods may have a plurality of lines, being located in a right angle direction with respect to a paper face of FIG. 1 concerning each jaw.

Furthermore, the energizing means for energizing the workpiece holding rod to the retreated position RP retreated in the direction as shown by the arrow C with respect to the axial center CT2 is not always the air supply path 25*i*. But, such a structure that a coil spring may be provided being contracted, always energizing the workpiece holding rod in the direction as shown by the arrow C so as to move in the direction as shown by the arrow C, making use of the elasticity of the coil spring at an opening state, is possible.

In this way, the workpiece 7 installed on the chuck 10 is machined. When the fluid pressure for holding the piston rod 25*g*, for instance, the oil pressure in the cylinder 25*b* is lowered for some cause, the decrease of the oil pressure is extended to the cylinders 25*b* of the all the third jaws 25 since the respective piston rods 25*g* of all the third jaws 25 holding the workpiece 7 are communicated and connected with each other by the connection tube 40 through the cylinders 25*b*.

Then, the piston rods 25*g* of each third jaw 25 are compulsorily moved in the direction as shown by the arrow C by the centrifugal force of the rotating chuck 10, and the workpiece 7 may be dropped out of the chuck 10.

Then, the main control portion 49 of the lathe 1 detects the piston rod 25*g* moving in the direction as shown by the arrow D, that is, detects the third jaw 25 moving in the closing direction through the sensor 42*c* of the sensor control portion 43 when the driving cylinder 42 of the chuck 10 is driven and moved from the chuck opening position P1 in the chuck closing direction, that is, in the direction as shown by the arrow E of FIG. 13 by the driving cylinder control portion 50. After the third jaw 25 is moved predetermined quantity in the direction as shown by the arrow D, the sensor 42*d* detects the driving cylinder 42 moving in the direction as shown by the arrow E and the third jaw 25 being driven to the chuck closing position P2 which is an usual workpiece holding position.

The sensor 42*d* is provided so as to detect the position of the driving cylinder 42 within predetermined bounds in the direction as shown by the arrows E and F since the usual workpiece holding position (the chuck closing position P2) changes by the shape of the workpiece to be machined. And, various kinds of sensors, such as an ultrasonic sensor and a magnetic sensor, can be used. In this case, it is necessary to position the sensor 42*d* at an intermediate position of the movable stroke of the driving cylinder 42 in the direction as shown by the arrows E and F, and the sensor 42*d* should not position at the maximum retracted position of the movable stroke in the direction as shown by the arrow E, that is, the position where the third jaw 25 is moved for the center of the chuck 10 to the utmost.

In this state, in the case of the chuck 10 having the adjusting screw 10, each third jaw 25 is further moved in the direction as shown by the arrow D by the adjusting screw 23 so as to position the workpiece holding portions 25*h* of the third jaw 25 at positions extremely close to the workpiece with the individual structure of the chuck 10, as shown in FIG. 1, as mentioned before. In case of the chuck 10 having no adjusting screw 23 wherein the third jaw 25 is directly installed on the slide member 21 or the like, the workpiece holding portions 25*h* of the third jaw 25 are already positioned at the positions extremely close to the workpiece 7.

Subsequently, the workpiece holding portion 25*h* is driven and projected in the direction as shown by the arrow D so as to get the workpiece holding portion 25*h* traced along the machining contour of the workpiece 7, as shown in FIG. 5, for instance. After the workpiece holding portions 25*h* of the all third jaws 25 project in the direction of the workpiece 7, interlocking by the connection tube 40 so as to abut on the outer peripheral portion of the machined workpiece 7, the position of the workpiece holding portion 25*h* is held and the driving cylinder 42 is further pulled in the direction as shown by the arrow E of FIG. 13 so as to strongly hold the workpiece 7 through the respective third jaws 25.

On this occasion, the driving cylinder 42 slightly moves 1 mm or so in the direction as shown by the arrow E, but the position can be certainly detected by the sensor 42*d*. And, the main control portion 49 can acknowledge that the workpiece 7 is certainly held by the chuck 10 through the three third jaws 25 from the detection results of the increase of the driving oil pressure of the driving cylinder 42 through the driving cylinder control portion 50 and the chuck closing position P2 of the driving cylinder 42 by the sensor 42*d*.

In this state, the second routine of machining is performed on the workpiece 7, as mentioned before. In case where the fluid pressure of the holding mechanism for holding the piston rods 25*g* of the third jaw 25 in the state of holding the workpiece is lowered for some reasons during machining, the force holding the workpiece 7 with the workpiece holding members, such as the piston rods 25*g*, is rapidly lost. So, it is necessary to immediately take an urgent stop measure, such as master stop of a machine including stop of the spindle.

As already mentioned before, the holding mechanisms for holding the workpiece holding members, such as the respective cylinders 25b, at predetermined positions, are mutually communicated and connected by the connection tube 40 in a plurality of the third jaws 25 of the chuck 10. Therefore, the decrease of the fluid pressure of a part of the holding mechanisms is linked to the decrease of the fluid pressure of all the holding mechanisms, and the piston rods 25g of each third jaw 25 are in the state of being capable of moving in the direction as shown by the arrow C by a centrifugal force with the rotation of the spindle.

But, the driving cylinder 42 is on the chuck closing position P2 during holding the workpiece 7, and is controlled so as to always energize the rod 42b in the direction pulling in the direction as shown by the arrow E of FIG. 13 by the driving cylinder control portion 50 in the state of holding the workpiece 7. With this structure, each third jaw 25 is always pressed in the direction as shown by the arrow D, that is, in the direction of the workpiece 7. Then, the driving cylinder control portion 50 supplies the driving cylinder 42 with oil pressure so as to move and drive the piston 42b on the arrow E side when the piston rod 25g of each third jaws 25 are in the state of being capable of moving in the direction as shown by the arrow C by lowering the oil pressure of the cylinder 25b. By doing so, the third jaw 25 is rapidly moved and driven in the direction as shown by the arrow D, relatively pulling the respective piston rods 25g in the direction as shown by the arrow C.

Then, the workpiece 7 held by the respective workpiece holding portions 25h can be held by some degree of holding force even in such a state that the fluid pressure of the cylinder 25b is lowered since the third jaw 25 is rapidly moved and driven in the direction as shown by the arrow D, and the workpiece 7 can be safely held by the chuck 10 for a predetermined time since each third jaw 25 moves in the full moving stroke in the direction as shown by the arrow D.

When the third jaw 25 starts moving in the direction as shown by the arrow D, the piston 42b of the driving cylinder 42 for driving the third jaw 25 also starts moving from the chuck closing position P2 in the direction as shown by the arrow E. Then, the sensor 42d, which has detected that the cylinder 42 positioned at the chuck closing position P2, can not detect the position of the piston 42b of the cylinder 42 by starting to move the piston 42b in the direction as shown by the arrow E, and then, the signal of the sensor 42d is turned Off from the ON state.

Then, the chuck failing control portion 46 acknowledges that inadvertent movement of the driving cylinder 42 generates during machining by the change of the signal of the sensor 42d, and immediately inputs all stop command ASC to the motor driving control portion 47. Receiving this, the motor driving control portion 47 stops all the motors of the lathe 1. By doing so, the workpiece 7 can be prevented from dropping out of the rotating chuck 10.

On this occasion, the projecting quantity of the piston rod 25g in the direction as shown by the arrow D when the workpiece 7 is held is small as much as possible since the third jaw 25 is moved and driven in the direction as shown by the arrow D at the time of holding the workpiece 7 and is moved and positioned at the position close to the workpiece 7 in advance, and the workpiece 7 is held in this state by projecting and driving the piston rod 25g in the direction of the workpiece 7. Then, the relative moving quantity of the piston rod 25g with respect to the cylinder 25b in the direction as shown by the arrow C is small, and the piston rod 25g can not be further moved in the direction as shown by the arrow C by immediately reaching to the stroke limit even if the fluid pressure of the holding mechanism of the piston rod 25g lowers and the piston rod 25g relatively retreats in the direction as shown by the arrow C.

Then, the movement of the piston rod 25g in the direction as shown by the arrow C is restricted since the piston rod 25g reaches to the stroke limit before the third jaw 25 is driven and moved in the direction as shown by the arrow D and is moved to the full stroke. Thereby, the third jaw 25 further moved and driven in the direction as shown by the arrow D can continue to holding the workpiece 7 through the piston rod 25g which movement is restricted, and the holding of the workpiece 7 can be effectively maintained during the time till the chuck failing control portion 46 finishes all stop movement of the motors.

The sensor for detecting the position of the cylinder 42 may have any structure as long as it can detect that the cylinder 42 is moved a predetermined stroke or more rather than a usual workpiece machining position or the workpiece holding position.

In the present invention, the control is performed so as to pull the third jaws in the axial center CT2 direction, which is the direction of holding the workpiece, and the workpiece 7 is safely held till emergency stop of the spindle 9 when the holding force of the workpiece with the respective workpiece holding portions 25h of the third jaw 25 is lowered.

Therefore, the driving form of the respective workpiece holding portions 25h of the sliding member, such as the third jaw 25, is not restricted to the structure using an oil pressure actuator or an air pressure actuator, as mentioned in the present embodiment. That is, any structure of the chuck and any driving form of the workpiece holding portion 25h will do as long as the sliding member is moved and driven in the axial center direction and the decrease of the workpiece holding force with the workpiece holding portions 25h can be prevented so as to take stop procedure meanwhile, such as urgent stop when the fixing holding means for fixing and holding the workpiece holding portions 25h are failed for some reasons in the chuck having the respective workpiece holding portions 25h, being free to move with respect to the axial center CT2 and free to be fixed and be held.

For instance, such a mechanism that each workpiece holding portion 25h is fixed and held, making use of magnetic force may be used in place of the method of fixing and holding with the oil pressure actuator 25b or the air pressure actuator 25b. In this case, the sliding member is immediately moved and driven in the axial center direction, the decrease of the holding force of the workpiece with the workpiece holding portion 25h is prevented as much as possible, and stop procedure, such as urgent stop is taken meanwhile even if electromagnet fails by power failure or the like and the workpiece holding portion 25h turns into the state of being able to freely move.

The workpiece holding portion 25h may be provided with a proper damper so as not to move the workpiece holding portion 25h in the radial direction with respect to the axial center CT2 (in the direction as shown by the arrow C of FIG. 1) at high speed such that the holding force of each workpiece holding portion 25h is maintained as much as possible by the movement of the sliding member in the direction as shown by the arrow D, that is, in the axial center direction at the time of failing.

That is, the workpiece holding portion 25h which holding force is lost at the time of failing is maintained in such a condition that it can not move at high speed in the direction as shown by the arrow C even after the holding force is lost by the operation of the damper. Then, the driving force of the sliding member in the direction as shown by the arrow D can be converted into the holding force of the workpiece through the workpiece holding portion 25*h* by moving the sliding member at high speed in the direction as shown by the arrow D, that is, in the direction of the axial center, making use of the delay characteristic of the damper, and the workpiece 7 can be effectively held.

Besides, a reciprocating drive means for moving and driving the third jaw 25 in the direction of the axial center CT2 is not limited to the driving cylinder 42 to be driven by oil pressure, but any means capable of driving and reciprocating within a predetermined stroke, such as a linear motor, will do.

Furthermore, as the means for detecting the release of the state of the workpiece fixed and held with the workpiece holding means, such as the workpiece holding portion 25*h* and the piston rod 25*g*, various sensors, such as an oil pressure sensor, an electric pressure sensor and a magnetic sensor, can be used according to the form of holding a workpiece with the chuck in addition to the sensor of the driving cylinder 42 for detecting the movement from the chuck closing position P2 which is a usual position of holding a workpiece, as the above-mentioned embodiment.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A control unit of a machine tool, said machine tool comprising:

a spindle being rotatable with an axial center as its center a chuck provided on said spindle;

a plurality of sliding members provided at said chuck, being free to move with respect to said axial center;

workpiece holding members provided at each said sliding member, being free to move and drive with respect to said axial center and being free to be fixed and held;

reciprocating drive means provided at said chuck, being free to drive and reciprocate within a predetermined stroke, thereby being free to move and drive said sliding member in a direction of said axial center; said machine tool having further characteristic:

projecting said workpiece holding members in said axial center direction and driving said reciprocating drive means so a to move said sliding members in said axial center direction when a workpiece is fixed and held with said chuck; said control unit comprising:

a sensor for detecting that the state of said workpiece being fixed and held with said workpiece holding members is released during rotation of said spindle; and a driving control means of said sliding member for driving and controlling said reciprocating drive means so as to drive said sliding member in said axial center direction when said sensor detects the state of said workpiece being fixed and held with said workpiece holding members is released.

2. The control unit of the machine tool as set forth in claim 1, wherein said reciprocating drive means has a driving cylinder, being free to reciprocate and drive a rod, and said rod is driven and reciprocated so as to move said sliding member in said axial center direction.

3. The control unit of the machine tool as set forth in claim 1, wherein said reciprocating drive means has a member, being free to drive and move within a predetermined stroke, and said sensor detects movement of said member so as to detect release of a state of said workpiece being fixed and held with said workpiece holding members.

4. The control unit of the machine tool as set forth in claim l, wherein interlocking drive means of said workpiece holding members is provided between said respective sliding members, and said workpiece holding members of said respective sliding members can be synchronously moved by said interlocking drive means.

5. The control unit of the machine tool as set forth in claim 4, wherein said each sliding member is provided with a fluid driving means of said workpiece holding member, and said interlocking drive means has a fluid piping means for connecting said fluid driving means of said respective sliding members.

6. The control unit of the machine tool as set forth in claim 3, wherein a position of said workpiece fixed and held with said reciprocating drive means is set at an intermediate position of said predetermined stroke of said reciprocating drive means.

7. The control unit of the machine tool as set forth in claim 1, wherein a spindle drive stop control means is provided for at least stopping rotating and driving said spindle when said sensor detects release of a state of said workpiece fixed and held with said workpiece holding members.

* * * * *